Nov. 11, 1924.  
H. P. HANSEN  
WINDSHIELD CLEANING DEVICE  
Filed March 3, 1921  2 Sheets-Sheet 2  
1,515,584
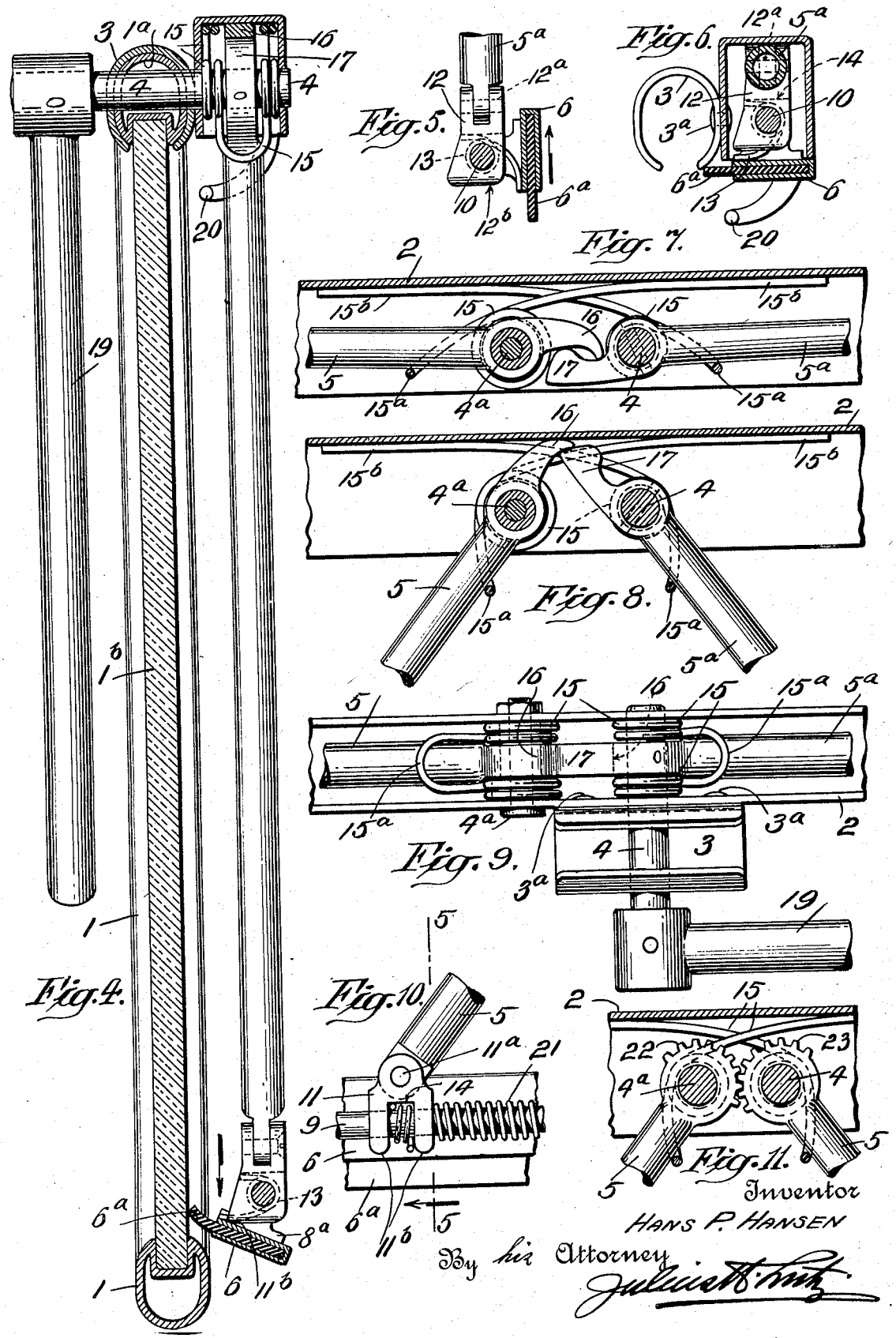
Inventor  
HANS P. HANSEN  
By his Attorney Patented Nov. 11, 1924.

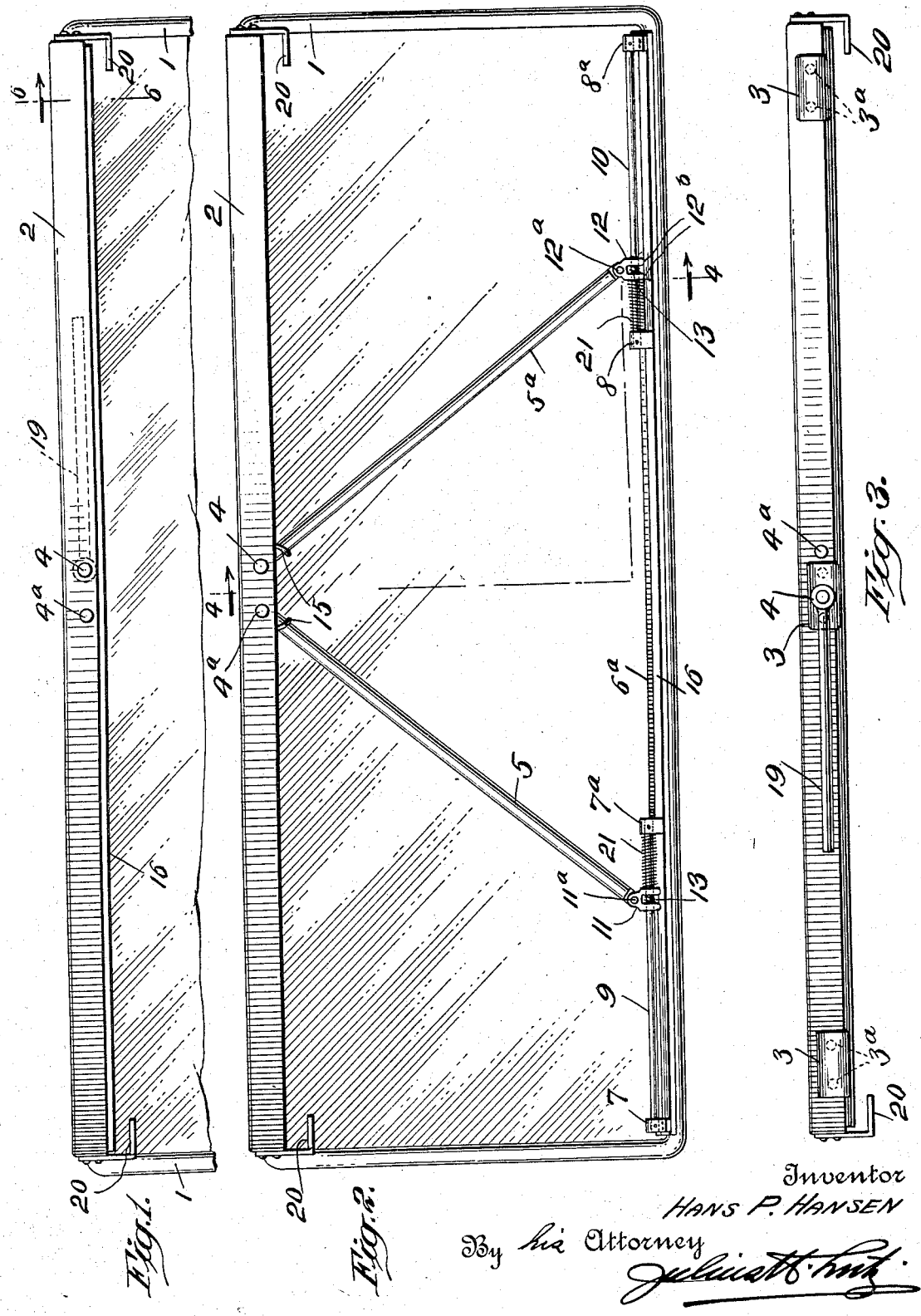

1,515,584

UNITED STATES PATENT OFFICE.

HANS P. HANSEN, OF ORANGE, NEW JERSEY, ASSIGNOR TO HANSEN WINDSHIELD CLEANER CO., INC., A CORPORATION OF NEW YORK.

WINDSHIELD-CLEANING DEVICE.

Application filed March 3, 1921. Serial No. 449,419.

*To all whom it may concern:*

Be it known that I, HANS P. HANSEN, a subject of the King of Denmark, and a resident of Orange, in the county of Essex and State of New Jersey, have invented certain new and useful Improvements in Windshield-Cleaning Devices, of which the following is a specification.

This invention relates to improvements in windshield cleaning device.

One of the objects of this invention is to produce a windshield cleaning device which is operable by a simple manipulation of a lever handle on the inner side of the windshield to clean the entire exterior glass surface of a windshield or the like and to this end to cause a wiper of substantially the width of the windshield to be moved vertically and firmly pressed in contact with the exterior surface of the glass and to be automatically returned to starting position upon release of the operating handle by the user.

Another object of my invention is the provision of means for causing a wiper extending horizontally or transversely of the glass of a windshield to have a downward cleaning movement during manual operation of the operating handle and to have a free upward movement, released from rubbing contact, on the upstroke or return movement so that the springs for causing the automatic return will be relieved of the load caused by a cleaning or rubbing contact.

Another object of my invention is to produce simple operating mechanism for causing a horizontally-disposed wiper to be moved vertically and to be maintained at all times during its movement in proper horizontal disposition or in substantially parallel relationship to the upper and lower rails of the windshield as well as in proper cleaning contact during its downward movement.

Still another object of my invention is to produce a compact and inexpensive construction of cleaning device which will cause the wiper to have a downward vertical movement over the entire glass surface and to be held in a yielding cleaning engagement at an angle to the plane of the glass during such cleaning movement and to be disengaged from contact on its return movement.

With these and other objects in view, the invention comprises the combination of members and arrangements of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a front elevation of my windshield cleaning device in its casing and fastened to the top of the windshield, the wiper bar being in its uppermost position;

Fig. 2 is a similar view with the wiper bar in its lowermost position;

Fig. 3 is a rear elevation of the cleaning device shown in Figs. 1 and 2 removed from the windshield;

Fig. 4 is a vertical section on the line 4—4 of Fig. 2;

Fig. 5 is a fragmentary detail view on the line 5—5 of Fig. 10, showing the connection between the wiper bar and the connecting arms and the position of the wiper bar during its upward movement;

Fig. 6 is a section on the line 6—6 of Fig. 1;

Fig. 7 is a fragmentary view showing a portion of the casing in longitudinal section and portions of the connecting arms in extended positions;

Fig. 8 is a similar view showing the connecting arms rocked downwardly to move the cleaner in the position shown in Fig. 2;

Fig. 9 is a fragmentary view of the center of the casing, wiper bar, operating arms and lever handle;

Fig. 10 is a detail view showing the connection between one of the connecting arms and the wiper bar, the latter being in the same position indicated in Fig. 5;

Fig. 11 is a fragmentary view similar to Figs. 7 and 8 of a modified form of connection between the two connecting arms and the operating shaft.

Referring now to these drawings, 1 indicates a windshield, to the upper end of which is secured, in any suitable manner, the casing 2 of my windshield cleaning device, which casing, as illustrated, comprises a channel or U-shaped bar preferably closed at its opposite ends. Said casing 2 is preferably mounted on the top of the windshield by brackets 3 which is riveted by rivets 3ª—3ª to the said casing 2 and is adapted to fit over the upper rail molding 1ª of the windshield.

Within the casing 2 are, as shown, mounted two shafts 4—4ᵃ and on these shafts are mounted two radially-extending connecting arms 5—5ᵃ, to the outer ends of which are connected a wiper-bar 6. The wiper-bar 6 has a travelling connection with the outer ends of the connecting arms 5—5ᵃ so that a conjoint arcuate movement of the said arms 5—5ᵃ will cause the wiper-bar to be moved vertically along the surface of the windshield glass 1ᵇ. As illustrated, the wiper-bar 6 has fixedly mounted adjacent to its opposite ends two pairs of bearings 7—7ᵃ and 8—8ᵃ. In the pair of bearings 7—7ᵃ adjacent to one end of the wiper-bar is mounted a rod 9 and in the pair of bearings 8—8ᵃ at the opposite end is mounted a rod 10. On the rods 9 and 10 respectively are mounted yoke-shaped slides 11 and 12 and these move or travel along the rods 9 and 10 respectively. These yoke-shaped slides are preferably pivotally connected at 11ᵃ—12ᵃ respectively to the arms 5—5ᵃ and are movable about said pivot only in the plane of movement of the arms so as to permit an articulating movement between the arms and slides. When the parts are so connected and mounted, the downward arcuate movement in equal arcs of the arms 5—5ᵃ will cause the travel of the slides 11 and 12 along such rods 9 and 10 respectively and will thus move the wiper-bar downwardly and upwardly or vertically in a plane parallel to the surface of the glass, and if the wiper-bar were rigidly connected to such connecting arm the movement thereof would cause the wiper in the wiper-bar to be rubbed against the surface of the glass in opposite directions. It is desirable, however, that the contacting movement of the wiper 6ᵃ be limited to the movement of the bar 6 in one direction only and that this direction should be the downward movement. It is also desirable that during this rubbing contact of the wiper 6ᵃ with the surface of the glass that it be maintained in such rubbing engagement yieldingly and that at the end of the downward stroke of the device the rubbing contact be eliminated so as to permit a more facile automatic return of the device.

For the purpose of procuring such a yielding contact during the downward movement of the wiper bar 6, I preferably provide a pivotal connection between the slides 11 and 12 with the wiper-bar 6 and then insert a spring 13 abutting between an elevated portion 14 of the said slides 11 and 12 and the upper surface 6ᵃ of the wiper bar 6 so that normally the wiper bar 6 will be swung pivotally on the rods and into parallel relationship to the arms 5—5ᵃ and the connecting slides 11 and 12 which, as aforesaid, are pivoted to move or articulate in the plane of movement of such arms only. This pivotal movement enables the swinging out of the way of the wiper bar 6 in its return or upward automatic movement. The connecting arms 5—5ᵃ are preferably normally retained in or moved to their uppermost position by means of springs 15 which are preferably coiled about the shafts 4—4ᵃ on which the arms 5—5ᵃ are mounted. Each of the springs 15 has, as shown, portions 15ᵃ abutting against the under side of the arms 5—5ᵃ respectively and other portions 15ᵇ—15ᵇ abutting against the inner surface of the top of the U-shaped casing 2, so that the springs will cause these connecting arms to be retained in their folded or uppermost positions. When the arms 5—5ᵃ are moved downwardly, they will, because of the travelling connection with the wiper-bar 6 cause the said wiper-bar 6 to be moved downwardly and because the springs 15 are stronger than the springs 13, said springs 15 will, in the upward automatic return movement cause the wiper-bar to be swung into the horizontal position indicated in Fig. 6 against the action of the spring 13, in which position the mouth of the casing 2 will be closed by the wiper-bar 6 and the wiper 6ᵃ.

It is desirable that both arms 5—5ᵃ be operated simultaneously from a single operating shaft, and to this end, I preferably pivot the arm 5 loosely upon the shaft 4ᵃ and provided the said arm 5 with a cam finger 16, the under surface of which abuts against the upper surface of the cooperating cam finger 17 mounted on the bar 5ᵃ, which latter arm is preferably fixed to an operating shaft 4 which extends through a hole or into a notch in the upper molding rail 1ᵃ of the windshield and has an operating lever 19 keyed thereto at its inner end within the car. The opposite ends of the casing are preferably provided with means for tripping the wiper-bar 6 in its downward movement so as to cause an initial tilting of the wiper bar 6 which in turn will cause the wiper 6ᵃ to be forced into contact and held resiliently against the surface of the glass at an angle to the plane thereof. This tilting is preferably accomplished by providing each end of the casing 2 with trips 20 which extend into the path of movement of the bar and cause an initial tilting of the bar 6 in its downward movement, which tilted position will be retained by the frictional contact of the wiper with the glass while power is applied to the operating handle in the downward movement of the wiper bar. The wiper 6ᵃ will therefore rub along the glass in such inclined plane during such downward movement of the said bar 6 by the arms 5—5ᵃ. The bar 6 is limited in its tilting movement by means of the toes 11ᵇ—12ᵇ on the connecting slides 11 and 12 respectively, which bear against the upper surface of the bar 6 during its downward movement and cause the pressure applied to the handle 19 to be exerted against the said bar in its tilted position and against the relatively weak pressure of the spring 13. So soon, however, as operating pressure on the handle is relieved, the wiper-bar 6 and its strip will swing pivotally as above described and the stronger spring 15 will cause the bar 6 to make a return movement in vertical position and then to be swung into the horizontal position shown in Fig. 6.

In the form of my invention illustrated, compression springs 21 are preferably mounted on the rods 9 and 10 to assist in forcing the slides outwardly along the said rods and consequently acting to assist the main spring 15 in automatically returning said arms 5 and 5ª to their uppermost positions.

In Fig. 11, I have illustrated a modified form of connection between the arms 5—5ª. In this modified construction, pinions 22 and 23 are mounted on the shafts 4 and 4ª and intermesh to cause the arms 5—5ª to be moved simultaneously.

Having described my invention I claim:—

1. A windshield cleaning device embodying, in construction, a wiper-bar extending transversely across the windshield and having a wiper mounted therein and pivotally mounted connecting arms movable in an arcuate path and having a travelling connection with said wiper bar for moving said wiper bar vertically in parallel relationship to the glass, means for causing said wiper to be held in yielding engagement with the surface of the glass during movement in one direction and to be moved away from said glass in its movement in the opposite direction, and means for moving said connecting arms.

2. A windshield cleaning device embodying, in construction, a wiper-bar extending transversely across the windshield and having a wiper mounted therein, slides mounted to have reciprocal movement on said wiper bar; arms pivotally mounted at the upper edge of the windshield to swing in a vertical plane adjacent to and parallel with the windshield, and having a pivotal connection with said slides, means for causing said connecting arms to move in an arcuate path to move the wiper bar parallel to the surface of the glass and means for swinging the bar about a horizontal axis to cause the wiper to be moved into contact with the surface of the glass of the windshield on its downward movement.

3. A windshield cleaning device embodying, in construction, a wiper-bar extending transversely across the windshield and having a wiper mounted therein, slides mounted to have reciprocal movement on said wiper bar; arms pivotally mounted at the upper end of the windshield in contiguous relationship to each other; means at said pivotal mountings to provide operative interengagement of said arms with each other to cause simultaneous movement in opposite directions and having a pivotal connection with said slides, means for causing said connecting arms to move in an arcuate path to move the wiper bar parallel to the surface of the glass and means for swinging the bar about a horizontal axis to cause the wiper to be moved into contact with the surface of the glass of the windshield on its downward movement.

4. A windshield cleaning device embodying in combination, an operating shaft and means for operating the same; pivotally-movable arms operatively connected with said shaft; a wiper bar having a wiper mounted therein and having a travelling connection with said pivotally-movable arms to cause said wiper bar to have vertical movement and also having a pivotal connection with said arms to permit said bar to be swung outwardly away from the surface of the windshield, spring means for moving the said bar normally in an outward direction away from the windshield and means adapted to move the wiper in said wiper bar into initial rubbing contact with the windshield against the action of said spring.

5. A windshield cleaning device embodying, in combination, an operating shaft and means for operating the same; pivotally-movable arms operatively connected with said shaft; a wiper bar having a wiper mounted therein and having a travelling connection with said pivotally-movable arms to cause said wiper bar to have vertical movement and also having a pivotal connection with said arms to permit said bar to be swung outwardly away from the surface of the windshield, spring means for moving the said bar normally in an outward direction away from the windshield and a stronger spring connected to the said arms and adapted to cause said wiper bar to be initially moved into horizontal position against the pressure of said first-mentioned spring.

6. A windshield cleaning device embodying, in combination, an operating shaft and means for operating the same; pivotally-movable arms operatively connected with said shaft; a wiper bar having a wiper mounted therein and having a travelling connection with said pivotally-movable arms to cause said wiper bar to have vertical movement and also having a pivotal connection with said arms to permit said bar to be swung outwardly away from the surface of the windshield, spring means for moving the said bar normally in an outward direction away from the windshield; a stronger spring connected to said arms and adapted to cause said wiper bar to be initially moved into horizontal position against the pressure of said first-mentioned spring, and tripping means in the path of movement of said wiper bar for causing initial wiping contact of the wiper during its downward movement by the operating means.

7. A windshield cleaning device embodying, in combination, an operating shaft and means for operating the same; pivotally-movable arms operatively connected with said shaft; a wiper bar having a wiper mounted therein and having a travelling connection with said pivotally-movable arms to cause said wiper bar to have vertical movement and also having a pivotal connection with said arms to permit said holder to be swung outwardly away from the surface of the windshield, spring means for moving the said bar normally in an outward direction away from the windshield, a stronger spring adapted to cause said wiper bar to be initially moved into horizontal position against the pressure of said first-mentioned spring, and tripping means in the path of movement of said bar for causing a tilting against the pressure of the first-mentioned relatively weak spring to cause a yielding contact between said wiper and glass during the power movement of the operating shaft and a movement out of contact by said relatively weak spring when power movement of the shaft is discontinued.

8. A windshield cleaning device embodying, in combination, an operating shaft and means for operating the same; pivotally-movable arms operatively connected with said shaft; a wiper bar having a wiper mounted therein and having a travelling connection with said pivotally-movable arms to cause said wiper bar to have vertical movement and also having a pivotal connection with said arms to permit said bar to be swung outwardly away from the surface of the windshield, spring means for moving the said bar normally in an outward direction away from the windshield, a stronger spring adapted to cause said wiper bar to be initially moved into horizontal position against the pressure of said first-mentioned spring, and tripping means in the path of movement of said bar for causing a tilting against the pressure of the first-mentioned relatively weak spring to cause a yielding contact between said wiper and glass during the power movement of the operating shaft and a movement out of contact by said relatively weak spring when power movement of the shaft is discontinued and means on said slides for limiting the tilting movement of said wiper bar and transmitting power movement to the wiper bar during actuation of said shaft.

In witness whereof, I have signed my name to the foregoing specification in the presence of two subscribing witnesses.

HANS P. HANSEN.

Witnesses:
FREDERICK P. RANDOLPH,
JOSEPH F. O'BRIEN.